United States Patent Office 3,287,064
Patented Nov. 22, 1966

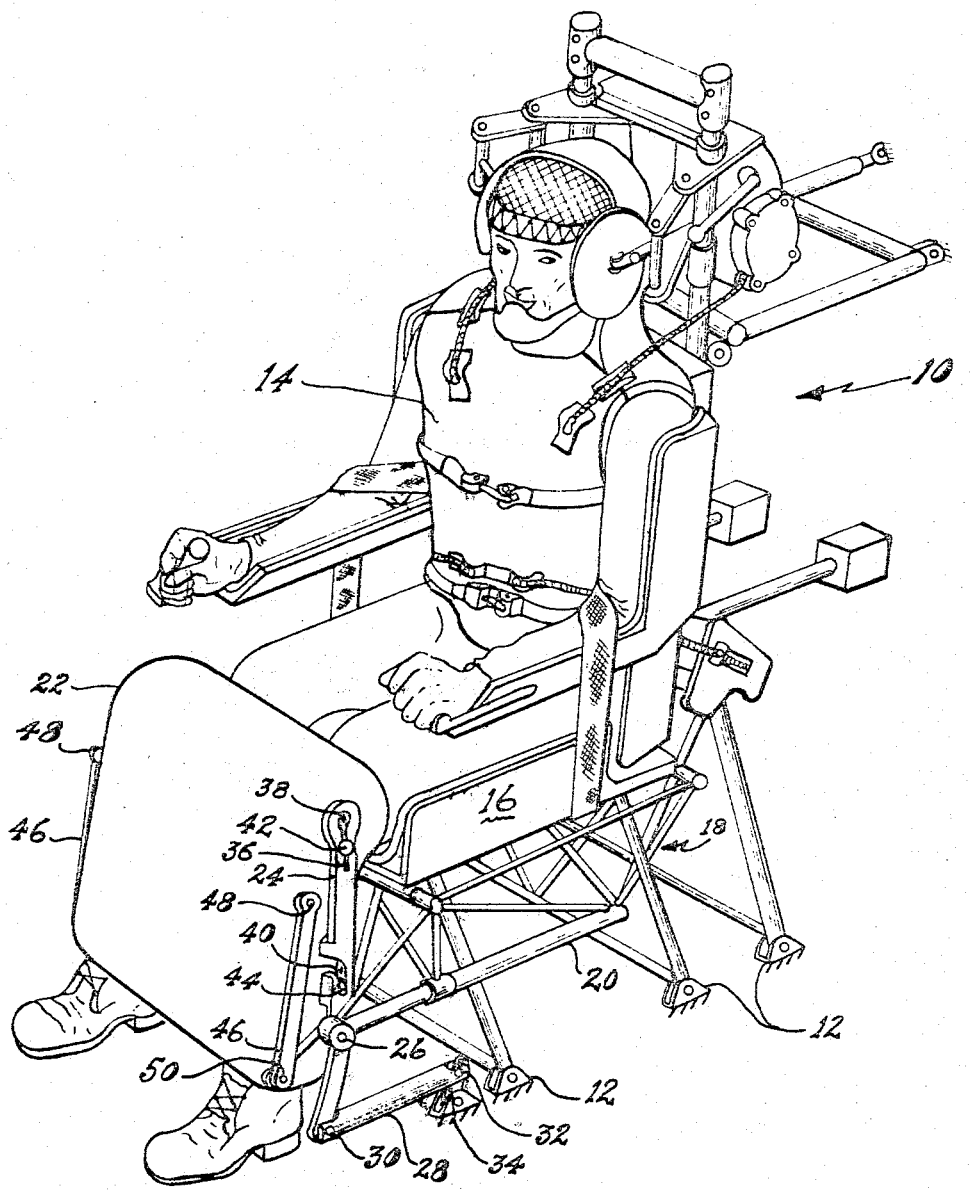

3,287,064
LEG RESTRAINT STOWING AND POSITIONING LINKAGE
Howard E. Freeman, Grand Prairie, Tex., assignor, by mesne assignments, to the United States of America as represented by the Secretary of the Air Force
Filed Feb. 27, 1964, Ser. No. 347,978
3 Claims. (Cl. 297—390)

This invention relates to a linkage for stowing and positioning a leg and knee restraint as part of a restraint system for the protection of astronauts or occupants of high performance aircraft.

The invention may be used with any restraint system employing a slidable seat pan where protection of the knee and legs of the occupant from accelerations is required and where it is desired to make ingress and egress to and from the device quick and easy. The ease of getting out of harness is important now that space flights are for extended periods, not only for the comfort of the occupant, but to avoid certain types of bed illnesses to which bed patients in hospitals are subject.

It is an object of this invention, therefore, to provide a device which will protect the legs and knees of an astronaut and at the same time permit easy ingress and egress from a space vehicle.

It is a further object to provide a linkage for controlling such a device which will work automatically when restraint is applied or removed.

It is also an object of this invention to provide such a device which can be manufactured inexpensively of readily obtainable materials which lend themselves to standard mass production manufacturing techniques.

The above and other advantages, features and objects of this invention will become apparent upon consideration of the following description and the attached drawing, wherein the figure is a view of an astronaut seated in a restraint system employing a knee and leg cover actuated by a linkage which is the subject of this invention.

In the figure, there is shown a seat 10 of a restraint system for a space vehicle. The seat 10 is secured to a support structure shown generally at 12 which may be part of the floor or frame of the vehicle. An astronaut indicated at 14 is shown in a seated position with leg restraint applied. The seat pan 16 of seat 10 is arranged to move in a horizontal, back and forth direction and has formed as a part thereof a tubular support frame shown generally at 18 which contains a horizontal bar 20 which reciprocates with the seat. The seat structure with its tubular support frame frame 18 is slidably mounted in a conventional manner with respect to the support structure secured at 12. A knee and leg cover 22 is shown exerting its pressure on the legs of the astronaut from his knees to his ankles. The cover 22 may be padded on its side adjacent the astronaut with foam rubber or some other resilient substance in order to make it comfortable for the occupant of the seat when the restraining force is exerted. The linkage arrangement for actuating the cover 22 is described in the singular; however, it should be understood that the same linkage arrangement is utilized on both sides of the cover.

Holding the knee and leg cover 22 in the position to immobilize the astronaut's legs is a heavy link 24 which is secured by means of a pivotal connection at 26 to the seat pan element 20. The link 24 extends below bar 20 and it is pivoted to a link 28 at 30. The other end of the link 28 is pivoted at 32 to another link 34, which in turn is pivoted to the seat support structure 12. Thus, it may be seen that movement of the rod 20 horizontally, since the connections of the bottom end of link 24 to the support 12 restrains the bottom end, causes a pivoting action of the link 24 such that the upper end of link 24 is rotated downwardly to the left as seen in the figure when the seat pan 16 is operated to the left.

The link 24 has an elongated slot 36 at its upper end which terminates in a round hole at 38 which has a diameter larger than the slot width. At the center of the link 24 there is a slot 40 which has a 90° bend therein to allow ingress and egress to the longitudinal portion of the slot. The leg cover 22 fastens to the link 24 at its upper end by means of a headed pin 42 while the slot 40 is connected to the leg cover by means of a pair of round pins 44.

The positioning of the leg cover 22 is achieved by means of a link 46 which is pivoted to the cover at 48 and to the seat structure at 50. The pivot at 50 is formed as an extension of the tubular support frame 18.

When the seat pan 16 including the frame 18 and the rod 20 move forwardly (to the left of the figure) to the unrestrained position, the positioning link 24 rotates to the left and the action of link 46 on the cover 22 biases the cover 22 to cause the pin 42 to rise in slot 36 of link 24. At the same time, pin 44 of the cover 22 rises within slot 40 such that when the upper pin 42 reaches the round hole 38, pin 44 is free to leave the slot 40 and the assembly acts as a four-bar linkage whereby link 46 cants the leg cover up sharply from the vicinity of the shins and the feet. The rising action of the cover 22 frees the knees while rotation of the cover 22 about an axis through 38 frees the remainder of the astronaut's legs.

On the return stroke of the seat structure the reverse action takes place, i.e., the cover rotates down and back until the lower pin 44 is captured by the primary link 24 in slot 40 and the upper pin 42 orients itself to slide in slot 36. The cover drops sharply down while the pins are in the straight portions of the slots at the latter part of the stroke, thereby forcing the knees down and back.

This action is automatic and requires no effort or thought on the part of the astronaut. Likewise, the release is automatic when restraint is removed, requiring no thought or effort on the part of the occupant.

Although the invention has been described with reference to a particular embodiment, it will be understood to those skilled in the art that the invention is capable of a variety of alternative embodiments within the spirit and scope of the appended claims.

I claim:

1. A knee and leg restraint system comprising a seat pan mounted on a support structure for movement forwardly and backwardly in a straight line from an unrestrained position to a restraint position, a leg and knee cover and linkage means connecting said seat pan and said cover to cause said cover to move away from said seat pan with its bottom portion canted away from said seat pan when said seat pan is moved to its unrestrained position and to cause said cover to move toward said seat pan and rotate downwardly to exert a pressure upon the knees and legs of a seated astronaut when said seat pan is moved to restraint position.

2. A system as defined in claim 1 wherein said linkage means comprises a first link secured at one end to said support structure for horizontal and pivotal movement, and slidably pivoted proximate to said one end to said seat pan and pivoted at its other end remote from said support structure to one side of said cover, a slot between said other end and said pivot proximate to said one end, said slot extending transverse to said first link for a portion of its length and extending along the longitudinal axis of said first link, a pin attached to said side of said cover for engagement with said slot when said cover is proximate to its restraint position, and a second link pivoted at its lower end to said seat pan and at its upper end to said cover.

3. A system as defined in claim 2 wherein said linkage means includes a duplicate of said links on the other side of said cover.

References Cited by the Examiner

UNITED STATES PATENTS

| | | | |
|---|---|---|---|
| 2,346,871 | 4/1944 | Provenzano | 297—390 X |
| 2,765,130 | 10/1956 | Replogle et al. | 244—122 |
| 2,833,554 | 5/1958 | Ricordi | 297—390 X |
| 2,904,286 | 9/1959 | Bleck | 244—122 |
| 3,095,170 | 6/1963 | Harb | 297—390 X |
| 3,111,293 | 11/1963 | Stott et al. | 244—122 |

FRANK B. SHERRY, *Primary Examiner.*

R. B. FARLEY, *Assistant Examiner.*